(12) United States Patent
Lamb et al.

(10) Patent No.: US 6,918,049 B2
(45) Date of Patent: Jul. 12, 2005

(54) METHOD AND APPARATUS FOR CONTROLLING THE PHASE OF THE CLOCK OUTPUT OF A DIGITAL CLOCK

(75) Inventors: Jonathan Lamb, Ringwood (GB); Wolfgang Bruchner, Southampton (GB); Richard Lansdowne, Eastleigh (GB)

(73) Assignee: Semtech Corporation, Camarillo, CA (US)

( * ) Notice: Subject to any disclaimer, the term of this patent is extended or adjusted under 35 U.S.C. 154(b) by 552 days.

(21) Appl. No.: 10/199,260

(22) Filed: Jul. 18, 2002

(65) Prior Publication Data

US 2003/0188215 A1 Oct. 2, 2003

Related U.S. Application Data

(60) Provisional application No. 60/367,875, filed on Mar. 26, 2002.

(51) Int. Cl.$^7$ ................... G06F 1/04; G06F 1/12
(52) U.S. Cl. .................. 713/500; 713/503; 713/400
(58) Field of Search ............... 713/500, 503, 713/400; 326/93; 327/291, 116; 375/376

(56) References Cited

U.S. PATENT DOCUMENTS

| 5,687,202 A | * | 11/1997 | Eitrheim ............... 375/376 |
| 5,940,608 A | * | 8/1999 | Manning ............... 713/503 |
| 6,677,786 B2 | * | 1/2004 | Kellgren et al. ......... 327/116 |

* cited by examiner

Primary Examiner—Thomas Lee
Assistant Examiner—Ji H. Bae
(74) Attorney, Agent, or Firm—O'Melveny & Myers LLP

(57) ABSTRACT

A clock synthesizer produces an output clock that has a programmable phase offset from the input clock. The clock synthesizer includes an accumulator and an offset adder. The output clock is derived from the offset adder. The offset adder receives a value derived from the accumulator and a selected phase offset value. The phase difference between the non-aligned output clock and the aligned output clock is determined by the phase offset value. The time resolution of the clock synthesizer may be defined by the clock rate of the system and the number of bits used in the offset adder and the accumulator.

20 Claims, 2 Drawing Sheets

METHOD AND APPARATUS FOR CONTROLLING THE PHASE OF THE CLOCK OUTPUT OF A DIGITAL CLOCK

CROSS-REFERENCE TO RELATED APPLICATION

This application claims priority pursuant to 35 U.S.C. § 119(e) to U.S. Provisional Application Ser. No. 60/367,875, filed Mar. 26, 2002.

BACKGROUND OF THE INVENTION

1. Field of the Invention

The present invention relates to electronic circuits and, more particularly, to digital clock synthesizers.

2. Description of Related Art

In applications that require a generated clock signal, a digital clock may be synthesized using a digital synthesizer. A conventional digital synthesizer is generally controlled by a high frequency clock and is used to generate a lower frequency clock. The frequency ratio between the generating clock and the generated clock is typically at least two. The generated clock may have some variation in each generated period due to the discrete sampling effect of the generating clock. But, the resulting synthesized clock will have an output pulse stream that is cyclic over some period of time, resulting in a consistent average frequency. If this output stream is averaged or filtered (such as using analog devices) then the output clock will have a more even period from cycle to cycle. Nevertheless, certain applications or situations require the output clock to be adjusted or tuned. For example, the clock may need to be tuned to align with other system components or to account for delays in the system clock distribution.

A programmable delay line is one conventional apparatus for tuning the output phase of a digital clock. A conventional programmable delay line includes a number of signal-passing elements that are connected to the output of a clock synthesizer. The signal-passing elements are connected in series such that the signal from the clock synthesizer is delayed by a small amount after passing through each element. The delay line includes a delay selection that has an input from the delay line after each signal-passing element. Accordingly, the clock output may be generated from different places in the delay line using the delay selection. The phase of the clock output may be changed depending on the location in the delay line from which the clock output is generated.

The conventional programmable delay line has a number of disadvantages and limitations. One disadvantage is that, because the length of a delay line is naturally limited, the range over which the phase may be changed is also limited. Another disadvantage is that, because there is a limit to the delay step size, the amount of phase change is also limited. Another limitation is that the amount of delay is not constant. Due to the nature of the components of a delay line, the amount of delay varies with, for example, temperature, power supply voltage, manufacturing process and other environmental conditions. Furthermore, because a delay line has a finite start and end, the delay line can run out of range. For instance, a user may not be able to select the desired clock output phase if the delay has to be either earlier than the start of the delay line or later than the end of the delay line.

Accordingly, there is a need for a technique for controlling the phase of a clock output over a wide range and with variable step size that ensures consistent performance over all process, voltage and temperature ranges.

SUMMARY OF THE INVENTION

The present invention provides a clock synthesizer that may produce an output clock that has a programmable phase offset from the input clock. The time resolution of the clock synthesizer may be defined by the clock rate of the system and the number of bits used in the offset adder and the accumulator.

In one exemplary embodiment, the clock synthesizer may produce a non-aligned clock output signal and a realigned output clock signal that is a phase shifted version of the output clock. The clock synthesizer includes an accumulator associated with a programmable overflow value. The non-aligned clock output signal is derived from the accumulator bus. The accumulator adder calculates the modulo sum of a selected frequency control value and the value on the accumulator bus. The accumulator register stores the modulo sum from the accumulator adder and places a selected portion of the register value on the accumulator bus. The offset adder bus is connected to the accumulator bus to carry an offset adder bus value derived from the accumulator bus. The offset adder calculates the modulo sum of a selected phase offset value and the value on the offset adder bus. The realigned output clock signal is derived from the offset adder modulo sum and, as a result, the phase offset between the realigned output clock signal and the input clock is defined by the selected phase offset value.

A more complete understanding of the clock synthesizer will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a system and method for controlling the phase of a clock output generated by a digital clock synthesizer, wherein the phase control allows for a programmable time resolution and is not susceptible to environmental conditions. In the detailed description that follows, like element numerals are used to describe like elements illustrated in one or more drawings.

Figure 1:
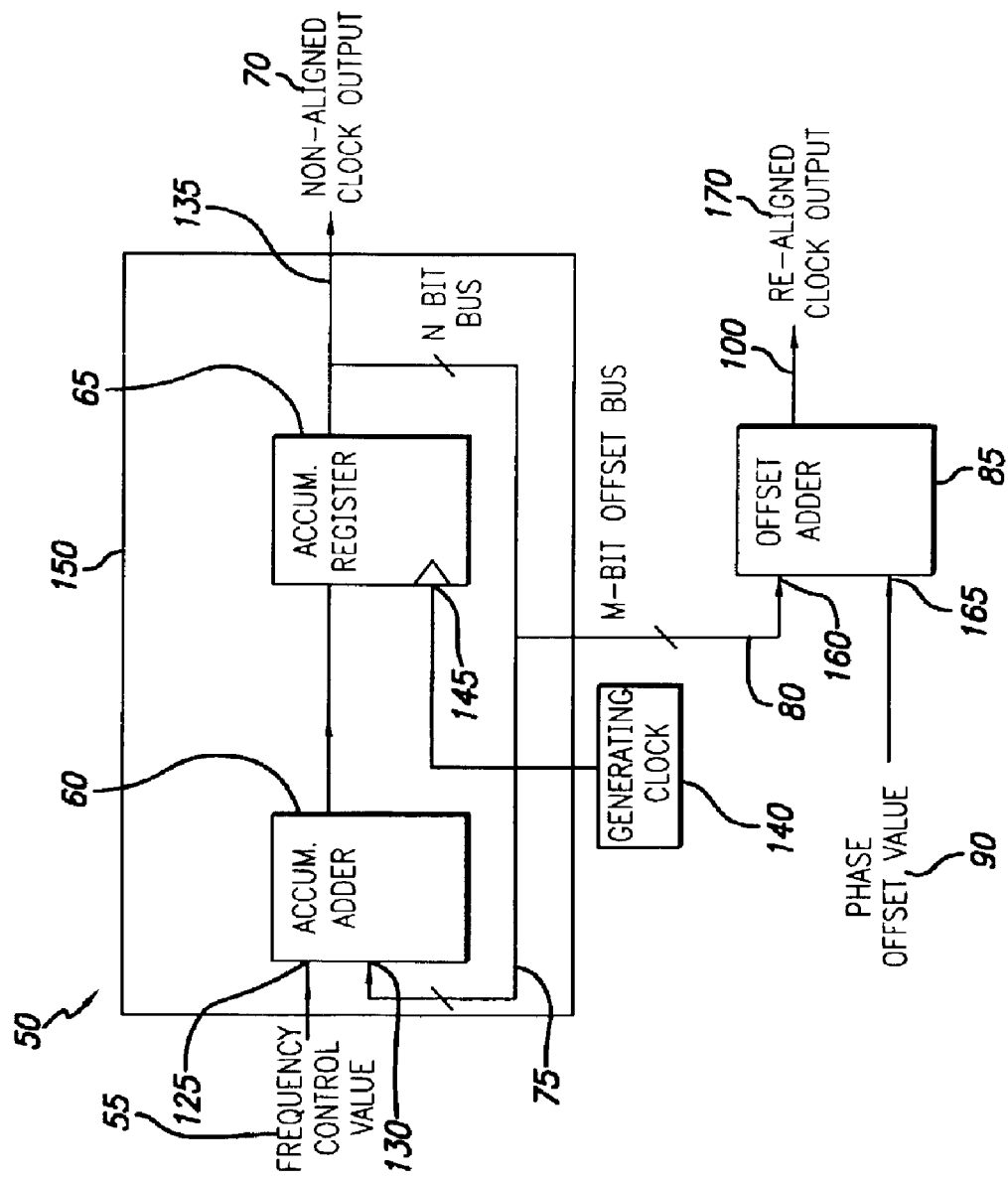
FIG. 1 shows an exemplary embodiment of the clock synthesizer.

FIG. 1 shows an exemplary embodiment of the clock synthesizer of the present invention, indicated generally at 50. Generally, clock synthesizer 50 may generate a clock signal having a particular frequency from a reference clock. Clock synthesizer 50 includes an accumulator adder 60, suitable for providing an addition function. In particular, accumulator adder 60 is an N-bit, modulo X adder, wherein N and X may each be any selected integer. The values for N and X may be selected according to the required specifications for clock synthesizer 50. Generally, accumulator adder 60 may accept two N-bit input numbers and produce the arithmetic sum of the two numbers. Accumulator adder 60 performs the addition according to modulo arithmetic, and thereby reduces all numbers to one of a fixed set, [0 . . . X–1], by subtracting X, if necessary, to ensure the result is within the range of this fixed set. For example, the sum of these two input numbers is compared to the value of (X–1). If the sum is less than (X–1), then the resultant output of accumulator adder 60 is the sum of the two input numbers. If the sum of the two output numbers is greater than (X–1), then the resultant output is the sum of the two numbers minus X.

Clock synthesizer 50 also includes an N-bit register 65. Register 65 may store an N-bit number and accept a generating clock signal 140 at clock input 145. Accordingly, the edge of the generating clock signal 140 loads the selected data into register 65. Accumulator adder 60 is connected to register 65 so that the output from accumulator adder 60 is stored in register 65. Accumulator adder 60 is also associated with an overflow value. This overflow value may be programmed. Accordingly, accumulator adder 60 and register 65 form an accumulator 150 that overflows periodically, e.g., the result of the addition operation exceeds the maximum allowed value of accumulator adder 60.

Accumulator adder 60 has a first input port 125 and a second input port 130. Accumulator adder 60 adds the value from its first input port 125 to the value at its second input port 130 according to modulo X addition. This sum is then added to the value stored in register 65, which serves as the accumulator register. The register value stored in register 65 is made available on the accumulator output port 135 and on the N-bit bus 75. Clock synthesizer 50 accepts an N-bit frequency control value 55. Frequency control value 55 is the input value for first input port 125 of accumulator adder 60. The value on bus 75 is the input for second input port 130 of accumulator adder 60.

A selected portion of accumulator 150 becomes the generated clock 70. In an exemplary embodiment, one bit of accumulator 150 becomes the generated clock 70. In another exemplary embodiment, this selected bit is the most significant bit. The frequency of generated clock 70 is controlled by frequency control value 55, the input value to accumulator 150. The number of bits in accumulator 150, e.g., N, determines the accuracy of the frequency generated for any particular increment number. Accordingly, the number of bits determines the step in output frequency associated with each consecutive value of frequency control value 55.

Clock 70 is the non-aligned clock output of clock synthesizer 50. A delayed version of clock 70 may be produced using another adder component, offset adder 85, with a fixed increment value. Offset adder 85 is an M-bit modulo Y adder. M may be any selected integer. Offset adder 85 has a first input port 165 and a second input port 160. The input value for first input port 165 is an M-bit fixed increment value or phase offset value 90. The input for second input port 160 is the value from M-bit bus 80. The value from N-bit bus 75 is loaded onto M-bit bus 80. The value from N-bit bus 75 may be scaled or modified before being placed on M-bit bus 80. For example, if M is less than N, then the value on M-bit bus 80 is accordingly scaled down. The value on output port 100 is the modulo Y sum of the phase offset value 90 and the value on bus 80. Offset adder 85 may have the same overflow value as the accumulator 150 used to generate the clock; however, if M is a different value than N, then the overflow value associated with offset adder 85 may be accordingly scaled. The final output clock 170 is then a selected portion of offset adder 85. In one exemplary embodiment, the selected portion is a selected bit of offset adder 85. In another exemplary embodiment, this selected bit is the most significant bit.

Thus, clock output 170 from offset adder 85 is a phase shifted version of clock output 70. The phase or delay of the realigned output clock 170 is controlled by the phase offset value 90 that is added to offset adder 85. The number of bits in offset adder 85, e.g., M, and the phase offset value 90 determine the average phase position of clock 170 generated by offset adder 85. Not all of the bits in accumulator 150 need to be passed to offset adder 85. For example, in an exemplary embodiment discussed above, only selected bits, e.g., the most significant bits are passed to offset adder 85. The exemplary embodiment of clock synthesizer 50 shown in FIG. 1 shows only one offset adder 85. However, it should be understood that clock synthesizer 50 may implement any number of offset adders 85, each with a selected fixed increment value 90 that may be different from that of the other adders 85. Accordingly, clock synthesizer 50 may have several output clocks 170, each with a different programmable phase offset.

The N-bit frequency control value 55 will determine the output frequency ($F_{OUT}$) of clock synthesizer 50 according to the following formula:

$$F_{OUT}=(F_{IN} \cdot \text{Freq})/X \qquad \text{(Formula 1)}$$

where,
$F_{IN}$=the frequency of the generating clock 140
$F_{OUT}$=the frequency of the generated clock 170 (or 70)
N=the number of bits in accumulator 150
X=the modulo value of accumulator 150 (the maximum register value is X–1)
Freq=the N-bit frequency control value 55

In a conventional application where the output clock is not phase aligned, the clock output would typically be generated by a signal from the original accumulator. But, in the exemplary embodiment depicted in FIG. 1, offset adder 85 generates the output.

The period ($\text{Period}_{OUT}$) of the output clock 170 may be defined by the following formula:

$$\text{Period}_{OUT}=X/(F_{IN} \cdot \text{Freq}) \qquad \text{(Formula 2)}$$

Offset adder 85 is effectively adding fractions of the period to output clock 170. The step size in time, or time resolution, of phase offset control 90 is defined by Y, the modulo number of offset adder 85. Clock synthesizer 50 may provide for more precise phase offset adjustment as the step size decreases, e.g., the time resolution increases. The step size ($\text{Stepsize}_{OUT}$) of the output signal 170 may be defined by the following formula:

$$\text{Stepsize}_{OUT}=X/(F_{IN} \cdot \text{Freq} \cdot Y) \qquad \text{(Formula 3)}$$

Note, that where the value of M is less than N, the value of Y is scaled from X in proportion to the ratio of M to N. The value of Y may be calculated according to the following formula:

$$Y=(X \cdot 2^M)/2^N \qquad \text{(Formula 4)}$$

The following examples show applications of the above disclosed formulas for exemplary embodiments of the present invention.

EXAMPLE 1

In this example, a 1.544 MHz clock is to be generated from a 100 MHz input clock and the phase is to be controlled using a 16-bit counter with a natural binary rollover of 65535 (e.g., a modulo value of 65536). Accordingly, the following values are:

$F_{IN}$=100 MHz $F_{OUT}$=1544 MHz

N=16

X=65536

The formula $F_{OUT}=(F_{IN}\cdot Freq)/X$ may be rearranged to solve for Freq, as follows:

$$Freq = (X \cdot F_{OUT})/F_{IN}$$
$$= (65536 \cdot 1.5444)/100 = 1012 \text{(rounded)}$$

The actual frequency is therefore approximately:

$$F_{OUT} = (F_{IN} \cdot Freq)/X$$
$$= (100 \cdot 10^6 \cdot 1012)/65536$$
$$= 1.544189 \text{ MHz}$$

As discussed above, the value for $Stepsize_{OUT}$, the step size resolution of clock synthesizer 50, is determined by the values for M, the bit size associated with phase offset control 90, and Y, the modulo number of this second adder. As shown in the following examples, the step size decreases with larger values for bit size M and Y. As a result, clock synthesizer 50 may make smaller and more precise changes in the phase offset with larger values for the bit sizes.

For the system described above, offset adder 85 has a 10-bit phase offset control and a natural binary rollover of 1024. Accordingly, the following values are:

$$M = 10$$
$$Y = 1024$$
$$Stepsize_{OUT} = X/(F_{IN} \cdot Freq \cdot 2^M)$$
$$= 65536/(100 \cdot 10^6 \cdot 1012 \cdot 1024)$$
$$= 632 \text{ ps}$$

The time step resolution may be improved by now using a 16-bit phase offset control with a natural binary rollover of 65536 (in this case, the same modulo value as X).

$$M = 16$$
$$Y = 65536$$
$$Stepsize_{OUT} = X/(F_{IN} \cdot Freq \cdot 2^M)$$
$$= 65536/(100 \cdot 10^6 \cdot 1012 \cdot 65536)$$
$$= 9.88 \text{ ps}$$

EXAMPLE 2

In this example, a 1.544 MHz clock is to be generated from a 100 MHz input clock and the phase is to be controlled using a 14-bit counter with a natural binary rollover of 12499 (e.g., a modulo value of 12500). Accordingly, the following values are:

$$F_{IN} = 100 \text{ MHz}$$

-continued
$$F_{OUT} = 1544 \text{ MHz}$$
$$N = 14$$
$$X = 12500$$
$$Freq = (X \cdot F_{OUT})/F_{IN}$$
$$= (12500 \cdot 1.5444)/100 = 193$$

The actual frequency is therefore, $$F_{OUT} = (F_{IN} \cdot Freq)/X$$
$$= (100 \cdot 10^6 \cdot 193)/12500$$
$$= 1.544 \text{ MHz}$$

For the system described above, offset adder 85 has a 8-bit phase offset control and a natural binary rollover of 196. Accordingly, the following values are:

$$M = 8$$
$$Y = 196$$
$$Stepsize_{OUT} = X/(F_{IN} \cdot Freq \cdot 2^M)$$
$$= 12500/(100 \cdot 10^6 \cdot 193 \cdot 196)$$
$$= 3.3 \text{ ns}$$

The time step resolution may be improved by now using a 14-bit phase offset control with a natural binary rollover of 12500 (in this case, the same modulo value as X).

$$M = 14$$
$$Y = 12500$$
$$Stepsize_{OUT} = X/F_{IN} \cdot Freq \cdot 2^M)$$
$$= 12500/(100 \cdot 10^6 \cdot 193 \cdot 12500)$$
$$= 518 \text{ ps}$$

The above examples show that the step size or time resolution of system 50 can be easily defined by the clock rates and the number of bits in adder 85 and accumulator 150. Furthermore, because system 50 is a purely digital system, it is not susceptible to any variations in temperature, voltage or manufacturing process.

Figure 2:
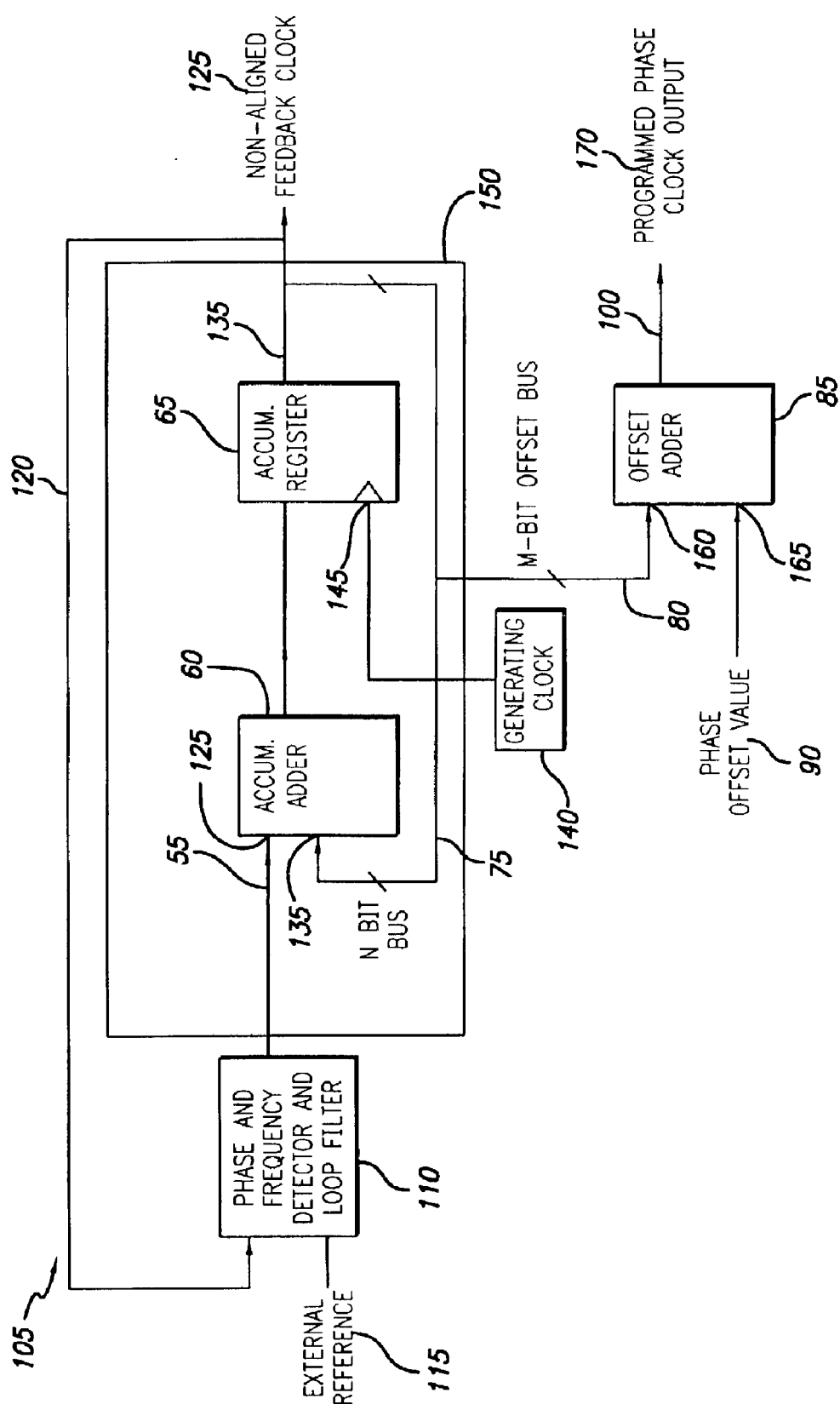
FIG. 2 shows an application of an exemplary embodiment of the clock synthesizer to a DPLL (digital phase locked loop) system.

Clock synthesizer 50 may be utilized in a number of different applications. For example, clock synthesizer 50 may be used within a DPLL (digital phase locked loop) system to provide a programmable input-output phase offset. FIG. 2 shows an exemplary embodiment of a DPLL system, indicated generally at 105. DPLL system 105 includes accumulator 120 and offset adder 85. As discussed above, offset adder accepts phase offset value 90 and bus 80. Bus 80 is derived from bus 75 of accumulator 150.

DPLL system 105 also includes PFD 110. PFD 110 is a digital feedback loop that tracks the differences in phase between the input, an external reference signal 115 and a feedback signal 120. PFD 110 may include a PFD (phase and frequency detector) and a loop filter. The PFD allows PFD 110 to determine the phase and frequency differences between external reference signal 115 and feedback signal 120. PFD 110 will naturally attempt to lock with external reference signal 115 and have the feedback 120 locked with a zero degree offset on average. The output 55 from PFD 110 and bus 75 serve as inputs to accumulator adder 60. The output of accumulator adder 60 is delivered to accumulator register 65. Register 65 places its contents on bus 75. The value on bus 75 is transmitted as a non-aligned feedback clock 125 and as feedback 120.

The value from bus 75, which represents the non-aligned feedback clock 125, is loaded onto bus 80. The value from bus 80 and phase offset value 90 serve as the inputs for offset adder 85. Accordingly, as described above, the output clock 100 of offset adder 85 is a phase shifted version of non-aligned feedback clock 125. This phase difference may be programmed by changing the value of phase offset value 90. Accordingly, DPLL system 105 allows the input-output phase offset of PFD 110 to be programmed with a high degree of accuracy.

Having thus described a preferred embodiment of the clock synthesizer, it should be apparent to those skilled in the art that certain advantages of the described method and system have been achieved. It should also be appreciated that various modifications, adaptations, and alternative embodiments thereof may be made within the scope and spirit of the present invention. For example, the clock synthesizer combined with a DPLL has been illustrated, but it should be apparent that the inventive concepts described above would be equally applicable to any electronic system in which an offset clock is required. The invention is further defined by the following claims.

What is claimed is:

1. A clock synthesizer operable to produce a non-aligned clock output signal and a realigned output clock signal based on an non-aligned output clock, wherein the realigned output clock signal is a phase shifted version of the non-aligned output clock, comprising:
   an accumulator associated with a selected accumulator overflow value and coupled to the input clock, comprising:
      an accumulator bus operable to carry an accumulator bus value, wherein the non-aligned clock output signal is derived from the accumulator bus value;
      an accumulator adder operable to produce an accumulator adder modulo sum of a value on a first adder input port and a value on a second adder input port, wherein the value on the first adder input is a selected frequency control value and the value on the second adder input port is the accumulator bus value; and
      an accumulator register coupled to the accumulator adder, wherein the accumulator register is operable to store a register value based on the modulo sum and place a selected portion of the register value on the accumulator bus to store as the accumulator bus value;
   an offset adder bus coupled to the accumulator bus, wherein the offset adder bus is operable to carry an offset adder bus value derived from the accumulator bus value; and
   an offset adder operable to produce an offset adder modulo sum of a value on a first offset adder input port and a value on a second offset adder input port, wherein the value on the first adder input is a selected phase offset value and the value on the second adder input port is the offset adder bus value, wherein the realigned output clock signal is derived from the offset adder modulo sum and wherein a phase offset between the realigned output clock signal and the input clock is derived from the selected phase offset value.

2. The clock synthesizer of claim 1, wherein the accumulator bus value is a selection of bits of the accumulator.

3. The clock synthesizer of claim 2, wherein the selection of bits are most significant bits.

4. The clock synthesizer of claim 1, wherein the input clock is associated with a selected input frequency ($F_{IN}$), the accumulator is associated with a selected accumulator modulo number (X) and a selected number of bits (N), the frequency control value is associated with a selected N bit value (Freq), and wherein the non-aligned clock and the realigned clock are associated with an output frequency ($F_{OUT}$) determined by the formula: $F_{OUT}=(F_{IN} \cdot Freq)/X$.

5. The clock synthesizer of claim 4, wherein the non-aligned clock and the re-aligned clock are associated with a period ($Period_{OUT}$) determined by the formula: $Period_{OUT}= X/(F_{IN} \cdot Freq)$.

6. The clock synthesizer of claim 5, wherein the offset adder is associated with a selected number of bits (M) and a modulo value (Y), and the clock synthesizer is associated with a step size ($Stepsize_{OUT}$) determined by the formula: $Stepsize_{OUT}=X/(F_{IN} \cdot Freq \cdot Y)$.

7. The clock synthesizer of claim 6, wherein the selected value N does not equal the selected value M and wherein the modulo value Y is determined by the formula: $Y=(X \cdot 2^M)/2^N$.

8. The clock synthesizer of claim 7, wherein the offset adder is associated with an offset adder overflow value that is equal to the accumulator overflow value scaled by the ratio of M to N.

9. The clock synthesizer of claim 1, wherein the offset adder is associated with a selected offset adder overflow value.

10. The clock synthesizer of claim 9, wherein the offset adder overflow value is equal to the accumulator overflow value.

11. The clock synthesizer of claim 1, wherein the clock synthesizer comprises a plurality of offset adders.

12. The clock synthesizer of claim 11, wherein selected phase offset value for a first offset adder is not equal to a selected phase offset value for a second offset adder.

13. A DPLL (digital phase locked loop) system, comprising:
   a PFD (phase and frequency detector) system operable to determine a phase difference between a first PFD input and a second PFD input and produce a PFD output that corresponds to the phase difference, wherein the first PFD input is an external reference signal and the second PFD input is a non-aligned feedback clock; and
   a clock synthesizer operable to produce a non-aligned feedback clock and a programmed phase clock based on the PFD output, wherein the programmed phase clock signal is a phase shifted version of the non-aligned feedback clock, comprising:
      an accumulator associated with a selected accumulator overflow value and coupled to the input clock, comprising:
         an accumulator bus operable to carry an accumulator bus value, wherein the non-aligned feedback clock is derived from the accumulator bus value;
         an accumulator adder operable to produce an accumulator adder modulo sum of a value on a first adder input port and a value on a second adder input port, wherein the value on the first adder input is the PFD output and the value on the second adder input port is the accumulator bus value; and
         an accumulator register coupled to the accumulator adder, wherein the accumulator register is operable to store a register value based on the modulo sum and place a selected portion of the register value on the accumulator bus to store as the accumulator bus value;

an offset adder bus coupled to the accumulator bus, wherein the offset adder bus is operable to carry an offset adder bus value derived from the accumulator bus value; and an offset adder operable to produce an offset adder modulo sum of a value on a first offset adder input port and a value on a second offset adder input port, wherein the value on the first adder input is a selected phase offset value and the value on the second adder input port is the offset adder bus value, wherein the programmed phase clock is derived from the offset adder modulo sum and wherein a phase offset between the programmed phase output clock signal and the non-aligned feedback clock is derived from the selected phase offset value.

14. The DPLL system of claim 13, wherein the PFD system further comprises a loop filter operable to filter the PFD system output.

15. The DPLL system of claim 13, wherein the accumulator bus value is a selection of bits of the accumulator.

16. The DPLL system of claim 15, wherein the selection of bits are most significant bits.

17. A method of generating a realigned clock output with a selected phase offset from an input clock from a clock synthesizer comprising an accumulator operable to perform modulo addition, an offset adder operable to perform modulo addition and an offset adder bus operable to store a offset adder bus value, comprising the steps of:

providing a frequency control value associated with a frequency of the realigned clock;

providing an accumulator bus value associated with the accumulator;

performing modulo addition of the accumulator bus value and the frequency control value to produce an accumulator adder sum;

replacing the accumulator bus value with a selected portion of the accumulator adder sum;

providing a phase offset value associated with the selected phase offset;

deriving the offset adder bus value from the accumulator bus value;

performing modulo addition of the phase offset value and the offset adder bus value to produce an offset adder sum; and generating the realigned clock output from the offset adder sum.

18. The method of claim 17, wherein the step of replacing the accumulator bus value with a selected portion of the accumulator adder sum comprises the step of selecting a most significant bit associated with the accumulator.

19. The method of claim 17, further comprising the steps of:

receiving an external reference signal;

comparing the external reference signal to the accumulator bus value to determine a phase difference between the external reference signal and the accumulator bus value; and transmitting a phase output signal associated with the phase difference.

20. The method of claim 17, further comprising the step of deriving the frequency control value from the phase output signal.

* * * * *